US012617490B2

(12) United States Patent
    Hahn

(10) Patent No.: US 12,617,490 B2
(45) Date of Patent: May 5, 2026

(54) TORQUE SENSOR SYSTEM AND DRIVE SYSTEM FOR AN ELECTRIC BICYCLE AND METHODS FOR THE USE THEREOF

(71) Applicant: SRAM, LLC, Chicago, IL (US)

(72) Inventor: Sage Hahn, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 148 days.

(21) Appl. No.: 18/480,649

(22) Filed: Oct. 4, 2023

(65) Prior Publication Data

US 2025/0115328 A1    Apr. 10, 2025

(51) Int. Cl.
    *B62M 6/50*        (2010.01)
    *B62J 6/01*        (2020.01)
(52) U.S. Cl.
    CPC . *B62M 6/50* (2013.01); *B62J 6/01* (2020.02)
(58) Field of Classification Search
    None
    See application file for complete search history.

(56) References Cited

U.S. PATENT DOCUMENTS

| | | | |
|---|---|---|---|
| 5,442,966 A | 8/1995 | Hase | |
| 8,746,081 B2 | 6/2014 | Sasaki | |
| 10,418,541 B2 * | 9/2019 | Matsumoto | ............. G01L 3/103 |

| | | | |
|---|---|---|---|
| 2003/0150276 A1* | 8/2003 | Christensen | ............. G01G 3/12 |
| | | | 73/795 |
| 2006/0152320 A1 | 7/2006 | Buhler | |
| 2016/0195145 A1 | 7/2016 | Fujiwara | |
| 2016/0273981 A1 | 9/2016 | Fujita | |
| 2016/0327444 A1* | 11/2016 | Ichikawa | ................ H01F 38/18 |
| 2018/0226565 A1 | 8/2018 | Hiroshi | |
| 2023/0174194 A1 | 6/2023 | Hahn | |

FOREIGN PATENT DOCUMENTS

| | | | |
|---|---|---|---|
| CN | 108609102 | | 10/2018 |
| CN | 216546551 U | * | 5/2022 |
| EP | 3696070 | | 8/2020 |
| EP | 3572237 | | 8/2021 |
| TW | M628514 U | | 6/2022 |
| WO | 2012/023386 | | 2/2012 |

* cited by examiner

*Primary Examiner* — Daniel L Greene

(57)    ABSTRACT

A torque sensor includes a contact sensor and a contactless sensor. An electric drive system for a bicycle includes an electric motor having a rotor rotatable about an axis. An output component is coupled to the electric motor and is rotatable about an axis. An input component is rotatable about the axis and is concentric with the output component and the rotor. A one-way clutch is disposed between the input component and output component. The contact sensor is coupled to the output component. The contact sensor is configured to measure a torque applied to the output component by the input component and provide an input signal. The contactless sensor is disposed between the output component and a fixed component. The contactless sensor is configured to provide an output signal proportional to the input signal.

17 Claims, 12 Drawing Sheets

FIG. 11

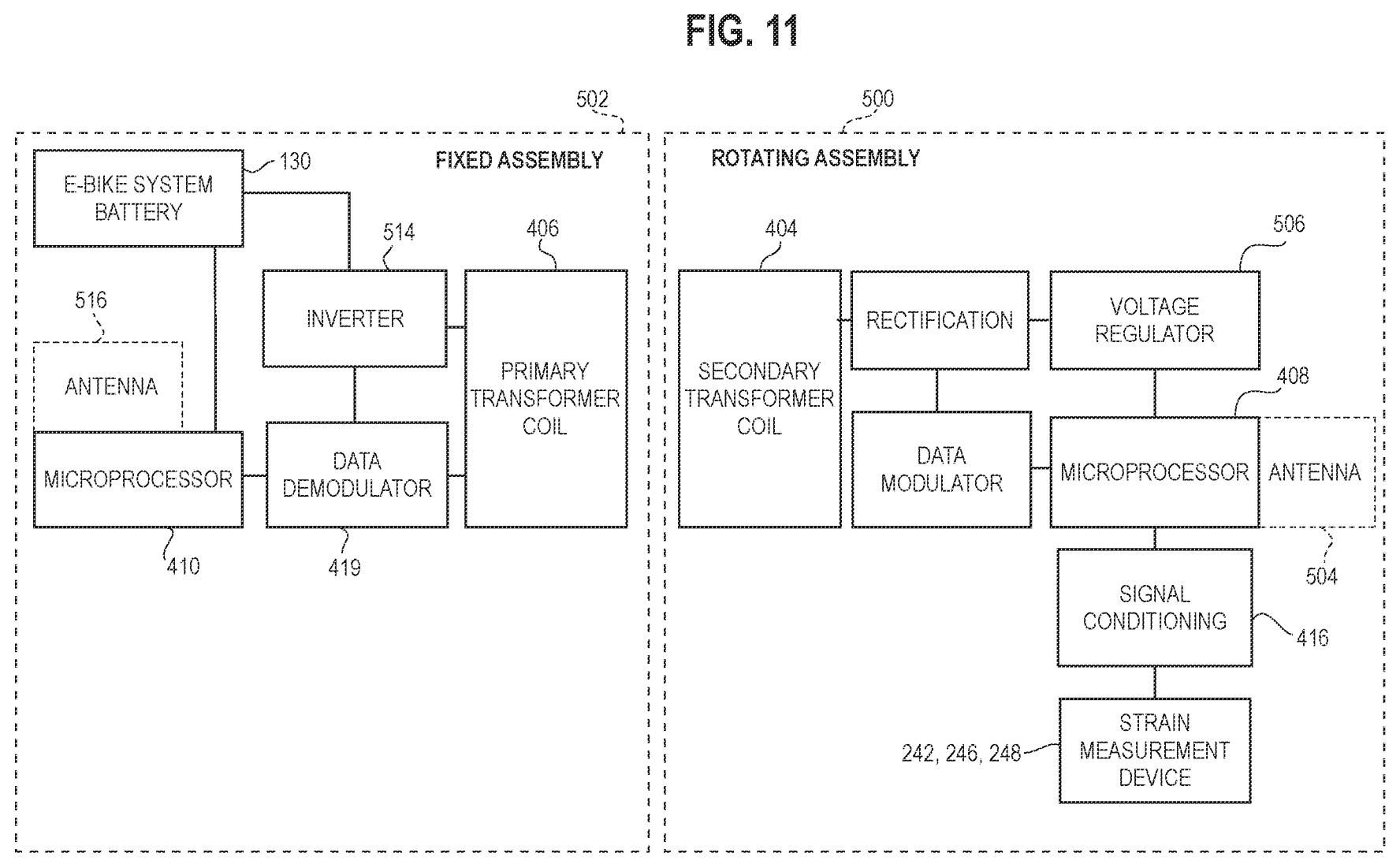

ROTATING ASSEMBLY — 500

VOLTAGE REGULATOR — 506

MICROPROCESSOR — 408

ANTENNA — 504

SIGNAL CONDITIONING — 416

STRAIN MEASUREMENT DEVICE — 242, 246, 248

RECTIFICATION

DATA MODULATOR

SECONDARY TRANSFORMER COIL — 404

FIXED ASSEMBLY — 502

PRIMARY TRANSFORMER COIL — 406

INVERTER — 514

DATA DEMODULATOR — 419

E-BIKE SYSTEM BATTERY — 130

ANTENNA — 516

MICROPROCESSOR — 410

TORQUE SENSOR SYSTEM AND DRIVE SYSTEM FOR AN ELECTRIC BICYCLE AND METHODS FOR THE USE THEREOF

BACKGROUND

1. Field of the Disclosure

The present disclosure is generally directed to a sensor for a bicycle, and more particularly, to a torque sensor for an electric bicycle, a drive system and methods for the use thereof.

2. Description of Related Art

A bicycle with a pedal assist electric motor (e.g., an electric bicycle or an ebike) may include sensors that monitor parameters at the bicycle. The monitored parameters may include, for example, input torque at a crank arm assembly of the bicycle.

Sensors that monitor the input torque may be positioned at the rear dropout, with the force from rider applied to the crank set transferred through the chain, cassette, hub, and wheel shaft before the sensor received it, requiring a series of calculations and compensations, and potential error in calculating the torque. Alternatively, the input axle may be directly accessible by the control electronics, so rider torque may be measured directly. In drive system where the motor is concentric to the rider input axle, however, there is no direct path between the control electronics and the rider input shaft, thereby making it difficult to measure the torque at the rider input interface.

SUMMARY

In one aspect, one embodiment of a torque sensor system for an electric bicycle includes an output component rotatable about an axis, wherein the output component is configured to be rotated by an electric motor. A contact sensor is coupled to the output component. The contact sensor is configured to measure a torque applied to the output component and provide an input signal. A contactless sensor is disposed between the output component and a fixed component. The contactless sensor is configured to provide an output signal proportional to the input signal.

In another aspect, one embodiment of a torque sensor system for an electric bicycle includes an output component rotatable about an axis, wherein the output component is configured to be rotated by an electric motor. A strain sensor is operably coupled to the output component and is rotatable with the output component about the axis. In one embodiment, an inner transformer coil is coupled to the output component and is rotatable about the axis with the output component. A non-rotatable outer transformer coil is radially spaced apart from and surrounds the inner transformer coil. In another embodiment, a radio transmitter is coupled to and rotatable with the output component about the axis, while a radio receiver, in communication with the transmitter, is spaced apart from the transmitter and is not in physical contact with the output component.

In another aspect, one embodiment of an electric drive system for a bicycle includes an electric motor having rotor rotatable about an axis. An output component is coupled to the electric motor and is rotatable about the axis. An input component is rotatable about the axis and is concentric with the output component and the rotor. A one-way clutch is disposed between the input component and output component. The one-way clutch is engaged between the input component and the output component when the input component is rotated in a first rotational direction, and wherein the one-way clutch is disengaged between the input component and the output component when the input component is rotated in a second rotational opposite the first rotational direction. A contact sensor is coupled to the output component. The contact sensor is configured to measure a torque applied to the output component by the input component and provide an input signal. A contactless sensor is disposed between the output component and a fixed component. The contactless sensor is configured to provide an output signal proportional to the input signal.

In one embodiment, the torque sensor includes a first sensor component coupled to the output component and rotatable about the axis with the output component, and a second sensor component radially spaced apart from the first sensor component and coupled to a fixed component, wherein the first and second sensor components are configured to measure a torque applied to the output component.

In another aspect, one embodiment of a method of measuring the torque applied to a bicycle drive train includes applying a torque to the output component with an input component, measuring the torque with a contact sensor coupled to the output component, periodically drawing a load current in a contactless sensor based on the measured torque, supplying a supply current to the contactless sensor proportional to the load current, measuring the supply current supplied to the contactless sensor, and calculating the torque based on the measuring of the supply current.

The various aspects and embodiments of the torque sensor, drive system and methods provide significant advantages over other torques sensors, drive systems and methods. For example, and without limitation, the torque sensor provides precise torque measurements, and is suitable for use on a drive system having a motor input concentric with the rider input shaft.

BRIEF DESCRIPTION OF THE DRAWINGS

Objects, features, and advantages of the present invention will become apparent upon reading the following description in conjunction with the drawing figures, in which:

FIG. 11 is a block diagram showing one embodiment of a torque sensor;

Other aspects and advantages of the embodiments disclosed herein will become apparent upon consideration of the following detailed description, wherein similar or identical structures have similar reference numerals.

DETAILED DESCRIPTION OF THE DISCLOSURE

Figure 1:
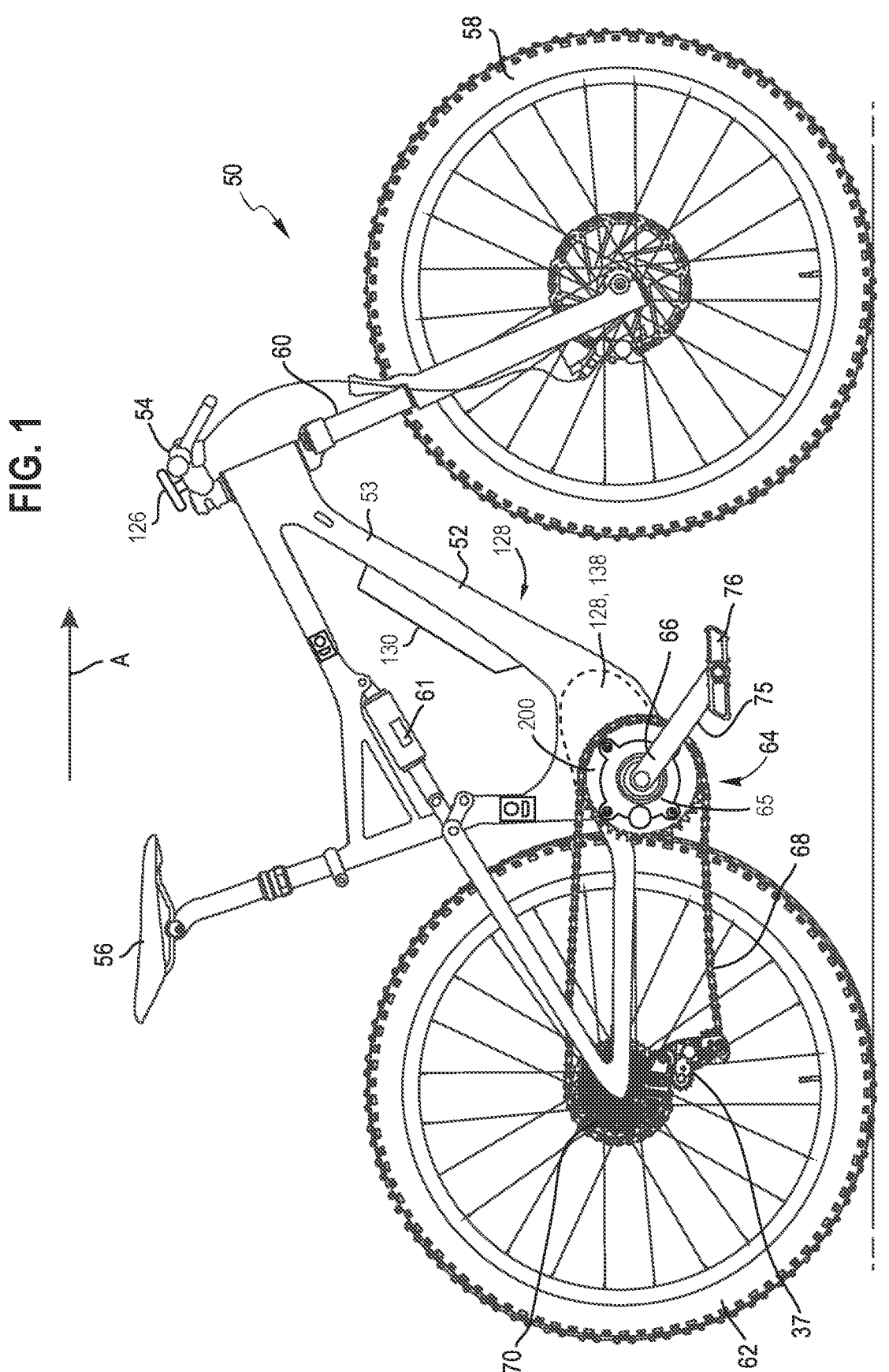
FIG. 1 is a side view of one example of an electric bicycle that includes a torque sensor in accordance with the teachings of this disclosure.

A bicycle with an electric pedal assist motor capable of driving a chainring independent of cranks (e.g., an ebike) is provided. Accurate, robust, and cost-effective torque sensing is to be provided for control of the ebike. For proportional control of the electric pedal assist motor, a controller of the bicycle may change an electric assist provided by the assist motor based on an amount of input torque generated by a rider at a crank assembly of the bicycle. For example, as sensed input torque increases, the controller increases the electric assist provided by the assist motor, and as the sensed input torque decreases, the controller decreases the electric assist provided by the assist motor.

For bicycle transmissions that utilize electronic shifting, as cadence increases, a controller running an automatic shifting algorithm initiates a gear shift. A rider of the bicycle may, however, prefer to pedal at a lower cadence when riding at a leisurely pace and may prefer to pedal at a higher cadence when riding aggressively. Automatic cadence band adjustment may be provided based on a sensed riding scenario. For example, the controller may increase a target cadence, and thus a target cadence band, for the automatic shifting when high input torque is sensed and decrease the target cadence and the target cadence band for the automatic shifting when low input torque is sensed.

A torque sensor according to the present disclosure may be incorporated within a radial contact clutch type system such as a roller bearing or sprag type rotary clutch mechanism of an ebike system. For example, a sprag type rotary clutch mechanism may be disposed between a crank input (e.g., a crank axle) and a chainring output and/or a motor input of the ebike system. The sprag type rotary clutch mechanism transmits torque in a first rotational direction but rotates freely in a second rotational direction that is opposite the first rotational direction. For example, the crank input drives, via the sprag type rotary clutch mechanism, the chainring output in the first rotational direction but freely rotates in the second rotational direction. When an assist motor of the ebike system drives the chainring output, such that the chainring output rotates faster than the crank input (e.g., pedaling by a rider of the bicycle), the sprag type rotary clutch mechanism slips or is overrun.

The sprag type rotary clutch mechanism, for example, generates high strain in a hoop section of an outer race (e.g., part of the chainring output) of the clutch mechanism proportional to reacted torque. The torque sensor of the present disclosure may measure the strain in the hoop section of the outer race. The measured strain may provide an input to a sensor. The torque sensor may be a contact sensor and/or be configured to rotate with the hoop section of the outer race to measure strain or other characteristic of the hoop section indicative of torque transmission therethrough.

Various embodiments of the invention will be described herein with reference to the drawings. It will be understood that the drawings and the description set out herein are provided for illustration only and do not limit the invention as defined by the claims appended hereto and any and all their equivalents.

It is to be understood that the specific arrangement and illustrated components of the frame, front wheel, rear wheel, drivetrain, front brake, rear brake, and saddle are non-limiting to the disclosed embodiments. For example, while the front brake and the rear brake are illustrated as hydraulic disc brakes, hydraulic rim brakes are contemplated and encompassed within the scope of the disclosure. Additionally, mechanical systems including mechanical rim brakes and mechanical disk brakes, as well as other electronic, hydraulic, pneumatic, and mechanical systems, or combinations thereof, such as suspension systems, are contemplated and encompassed within the scope of the present disclosure.

It should be understood that the term "plurality," as used herein, means two or more. The term "longitudinal," as used herein means of or relating to a length or lengthwise direction. The term "lateral," as used herein, means situated on, directed toward or running in a side-to-side direction. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first axis may be the same as a second axis, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 50, shown in FIG. 1, from the perspective of a user seated thereon, for example with an "inboard" component or feature being closer to a vertical mid-plane of the bicycle extending in a direction A. The term "transverse" means non-parallel. The terms "outer" and "outwardly" refer to a direction or feature facing away from a centralized location, for example the phrases "radially outwardly," "radial direction" and/or derivatives thereof, refer to a feature diverging away from a centralized location, for example a rotation axis of the chainring assembly as shown in FIG. 1-5. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle 100.

Turning now to the drawings, FIG. 1 generally illustrates a bicycle 50 with which one or more system control devices may be used to implement a bicycle control system using the torque sensor described herein. In this example, the bicycle 50 may be a mountain bicycle. In some cases, the bicycle 50 may be an e-bike. The bicycle 50 has a frame 52, a handlebar 54 near a front end of the frame 52, and a seat or saddle 56 for supporting a rider over a top of the frame 52. The bicycle 50 also has a first or front wheel 58 carried by a front fork 60 of the frame 52 and supporting the front end of the frame 52. The bicycle 50 also has a second or rear wheel 62 supporting a rear end of the frame 52. The rear end of the frame 52 may be connected to a rear suspension component 61. The bicycle 50 also has a drive train 64 with a crank assembly 66 that is operatively coupled via a chain ring 65, a chain 68 and a rear derailleur 37 to a rear cassette 70 near a rotation axis of the rear wheel 62. The crank assembly 66 includes two cranks 75 and two pedals 76 connected to the two cranks 75, respectively, on opposite sides of the frame 52 of the bicycle 50. In the example shown, the rear derailleur 37 includes a power source (e.g., a battery) and a motor, and receives instructions (e.g., wirelessly) from a controller 126 (e.g., a shifter or a central controller) mounted, for example, to the handlebar 54 or the frame 52 to shift gears on the rear cassette 70.

The battery 130 for the e-bike control system 128 is also supported by the frame 52 of the bicycle 50. For example, the battery 130 of the e-bike control system 128 is supported by a bottom tube 53 of the frame 52 of the bicycle 50. One or more components (e.g., the controller 126) of the bicycle 50 may be coupled with the power source 130 of the e-bike control system 128 via other wires, respectively.

The battery 130, for example, powers a drive unit 138 (e.g., including an e-bike motor 200) that is operatively coupled to the crank assembly 66. In one embodiment, the drive unit 138 may also be powered by a separate battery to provide access to e-bike controls when the battery 130 of the e-bike control system 128 is not attached to the bicycle 100. In one embodiment, shown in FIG. 4, the motor 200 includes a rotor 250 that rotates relative to a stator 252. The stator 252, which is rotationally fixed, receives a current from the battery 130 and creates a magnetic field driving, or rotating, the rotor 250. The rotor 250 is coupled to, directly or indirectly, and drives an output component 204. A transmission 260, or speed reducer, may be coupled between the rotor 250 and the output component 204.

The drive unit 138 is mounted to the frame 52 of the bicycle 50. For example, the drive unit 138 is mounted to the frame 52 of the bicycle 50 with one or more bolts and threaded openings within the frame 52 of the bicycle 50. The drive unit 138 may be attached to the frame 52 in other ways. A crank axle 202 (e.g., a crank shaft) runs through an opening through the drive unit 138 and connects the two cranks 75 of the crank assembly 66. During operation, the rider rotates the two cranks 75 via the two pedals 76, rotating the crank axle 202. The crank axle 202, which defines an input component, drives the output component 204 (e.g., a chainring shaft) of the drive unit 138 in a forward drive direction but not in a back pedaling direction through the use of, for example, a one-way clutch 206 (e.g., a sprag type rotary clutch mechanism) between the crank axle 202 and the output component 204.

The measured torque applied to the crank axle 202, or input component, may be used to control the electric drive motor 200 (e.g., an assist motor) of the drive unit 138. The motor 200 may directly or through the use of gears in the transmission 260 drive rotation of the output component 204. The output component 204 thus provides an output power to the drive train 64 that is a combination of rider input power from the crank axle 202 and an output power of the assist motor 200.

While the bicycle 50 depicted in FIG. 1 is a mountain bicycle and may include suspension components, such as a shock absorbing front fork, the specific embodiments and examples disclosed herein as well as alternative embodiments and examples may be implemented on other types of bicycles. For example, the disclosed torque sensors may be used on road bicycles, as well as bicycles with mechanical (e.g., cable, hydraulic, pneumatic, etc.) and non-mechanical (e.g., wired, wireless) drive systems.

The front and/or forward orientation of the bicycle 50 is indicated by the direction of the arrow "A" in FIG. 1. As such, a forward direction of movement of the bicycle 50 is indicated by the direction of the arrow A.

The drive unit 138 may include internal electronics to control operation of the assist motor 200, measure axle inputs, measure an inclination of the bicycle 50, measure an acceleration of the bicycle 50, measure a temperature of the bicycle 50, and/or reduce a voltage of the battery 130 of the e-bike control system 128 to accommodate and power external devices if lower voltages are required. For example, the internal electronics of the drive unit 138 may include one or more torque sensors 220. Additional, fewer, and/or different internal electronics may be provided within the drive unit 138.

A controller of the drive unit 138 (e.g., an e-bike central control system or controller; a system control device) may be disposed on a housing of the drive unit 138 and wired to the internal electronics of the drive unit 138. Alternatively or additionally (e.g., as part of a same housing), the e-bike controller may be supported by a same housing as the power source 130. The e-bike controller may be made of a material through which wireless control signals may pass. In one embodiment, the e-bike controller is wired to the e-bike control system 128.

The e-bike controller may control power from the power source 130 to components on the bicycle 50 such as, for example, the electric drive motor 200 of the drive unit 138. The e-bike controller may control power to other and/or different components on the bicycle 50. The e-bike controller may send signals (e.g., instructions) to and/or receive data (e.g., instructions and/or sensor data) from components on the bicycle 50 such as, for example, the rear derailleur 37, a suspension system, and/or a seat post assembly to actuate and/or control components of the bicycle 50.

In other embodiments, the e-bike controller may be located in other locations (e.g., mounted on the handlebar 54) on the bicycle 50 or, alternatively, may be distributed among various components of the bicycle 50, with routing of a communication link to accommodate necessary signal and power paths. For example, a control unit 126 (e.g., acting as the e-bike controller; a system control device) may be mounted to the handlebar 54 for actuating a motor of the rear derailleur 37 and operating the rear derailleur 37 for executing gear changes and gear selection. The control unit 126 and/or the e-bike controller, however, may be located anywhere on the bicycle 50 or, alternatively, may be distributed among various components of the bicycle 50, with routing of a communication link to accommodate necessary signal and power paths. The control unit and/or the e-bike controller may also be located other than on the bicycle 50, such as, for example, on a rider's wrist or in a jersey pocket. The communication link may include wires, may be wireless, or may be a combination thereof. The control unit and/or the e-bike controller may include a processor, a communication device (e.g., a wireless communication device), a memory, and one or more communication interfaces.

Data from the drive unit 138 (e.g., sensors 220) and/or the crank assembly 66 may be transmitted to the e-bike controller. The data may be transmitted via one or more wired connections and/or wirelessly. For example, a torque sensor 220 generates data representing input torque and/or power applied to the crank axle 202 and transmits the data to the e-bike controller.

All the communication between the one or more system control devices of the bicycle 50 (e.g., the e-bike control system 128) and each component is achieved through wired or wireless communication. There may be discrete control with individual wires from the respective system control device to each component to be controlled by the respective system control device, or at least one of the system control devices may use a controller area network ("CAN") bus configured to allow microcontrollers and devices to communicate with each other in applications.

The data transmitted to the system control device may be used for determining an amount of assist to provide via the electric drive motor 200 of the drive unit 138. Alternatively or additionally, the data transmitted to the system control device may be used for automatic shifting.

The data transmitted to the system control device may include torque data from one or more sensors 220 (e.g., of the drive unit 138 and/or the crank assembly 66). The torque data may correspond to torque input by a rider at the cranks 75 and may be used by the system control device to control an amount of assist provided by the electric drive motor 200 (e.g., for proportional control of the electric drive motor 200) and/or as an input for controlling an automatic shifting mode of the bicycle 50, for example.

FIGS. 5-10C illustrate a first example of a torque sensor 220 that may generate such torque data for use by the system control device. Referring to FIGS. 4-7, the crank axle 202, or input component, drives the output component 204, configured as an output ring 230 (e.g., chainring output and motor input) of the drive unit 138 in a forward drive direction but not in a back pedaling direction through the use of, for example, a sprag type rotary clutch mechanism 206 (e.g., a clutch mechanism) between the crank axle 202 and the output component 204. The crank axle 202 acts as an inner race of the clutch mechanism 206, and the output ring 230 acts as an outer race of the clutch mechanism 206.

The crank axle 202 and the output ring 230 are cylindrical in shape. For example, the crank axle 202 is a solid cylinder, and the output ring 230 is a hollow cylinder. In one embodiment, the crank axle 202 is also a hollow cylinder. The crank axle 202 may be made of any number of materials including, for example, steel or an aluminum alloy.

Figure 4:
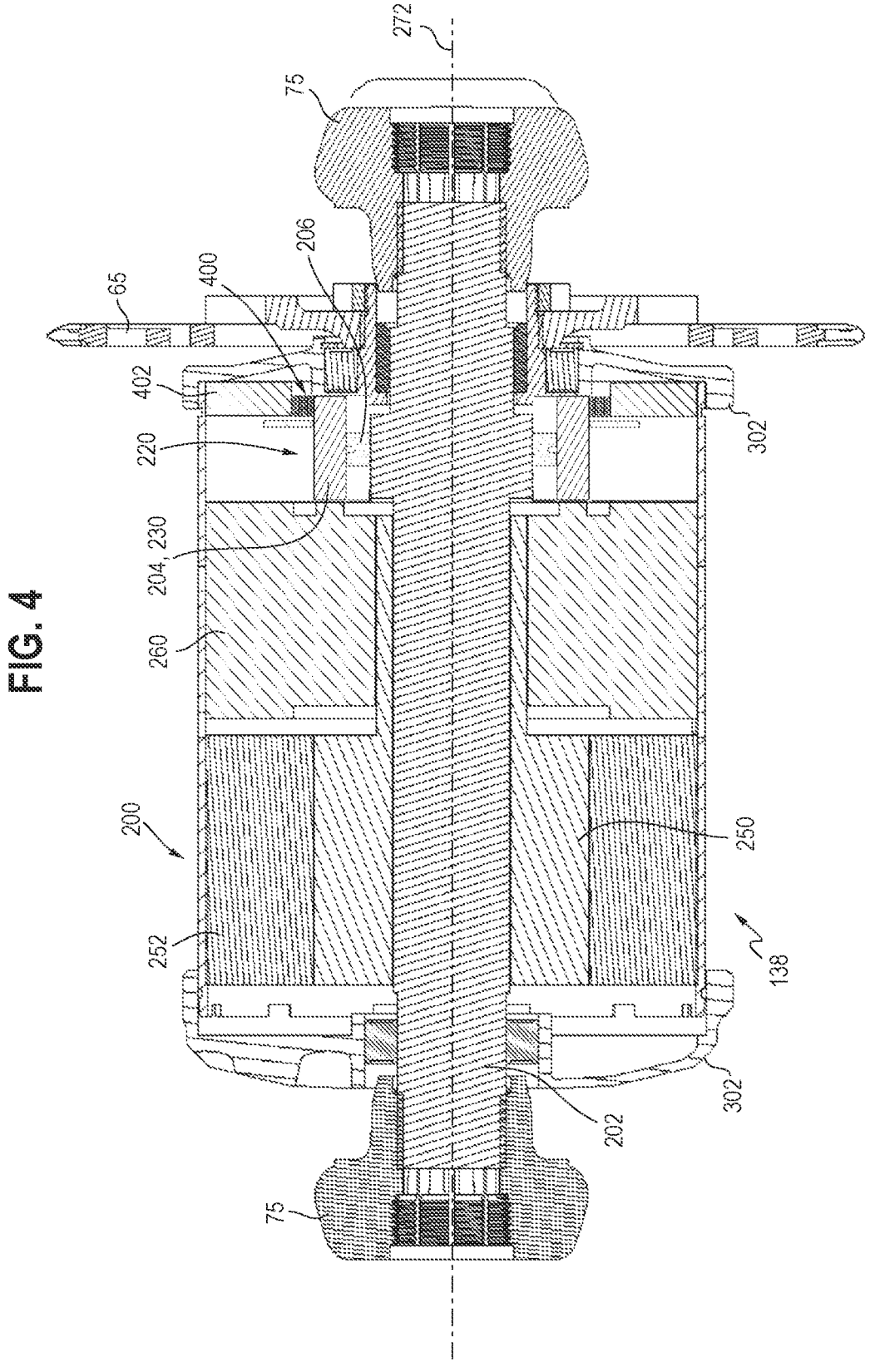
FIG. 4 is a cross-section of the drive system of FIG. 2.
Figure 5:
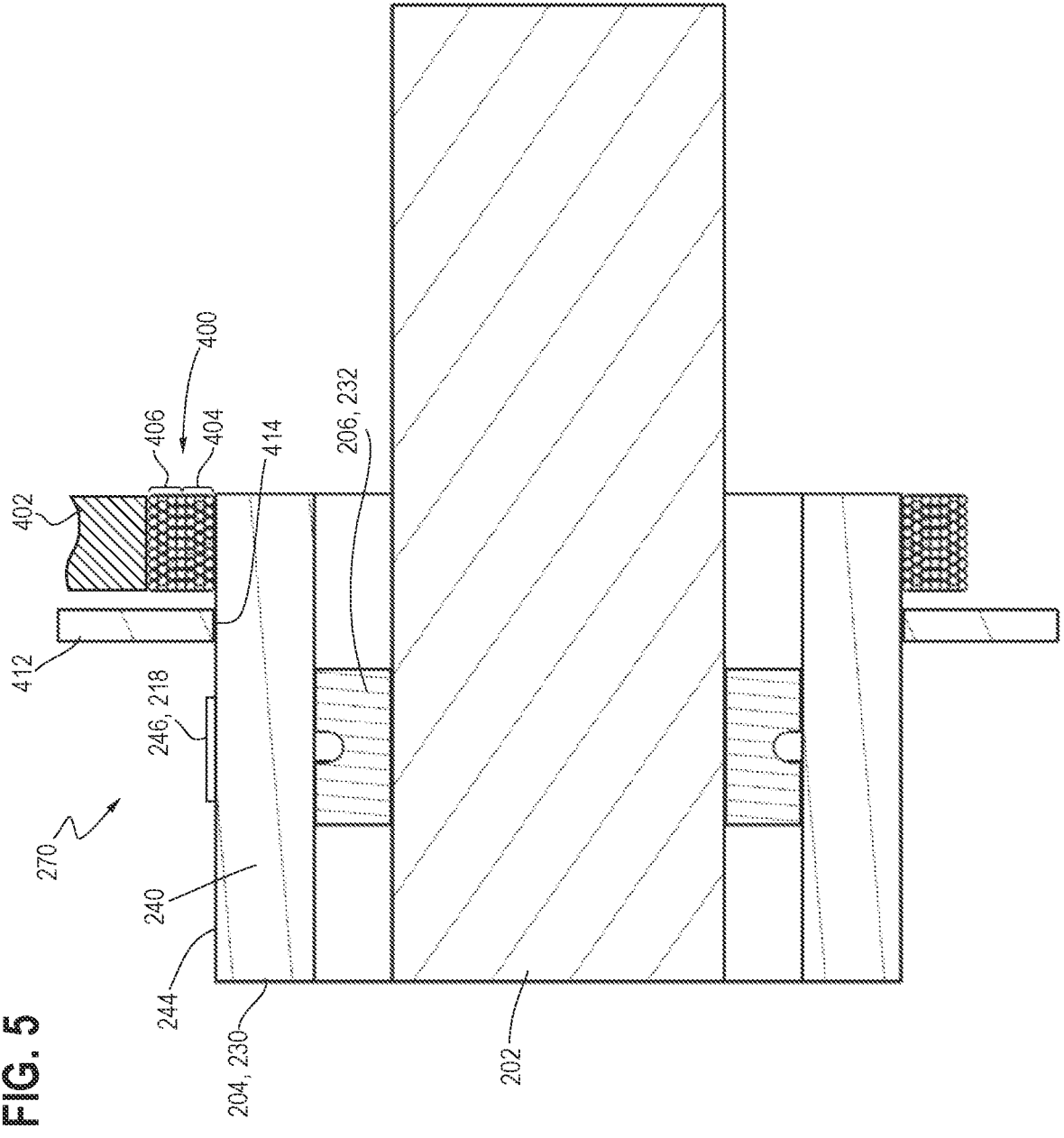
FIG. 5 is a partial cross-section of the drive system including a torque sensor.
Figure 6:
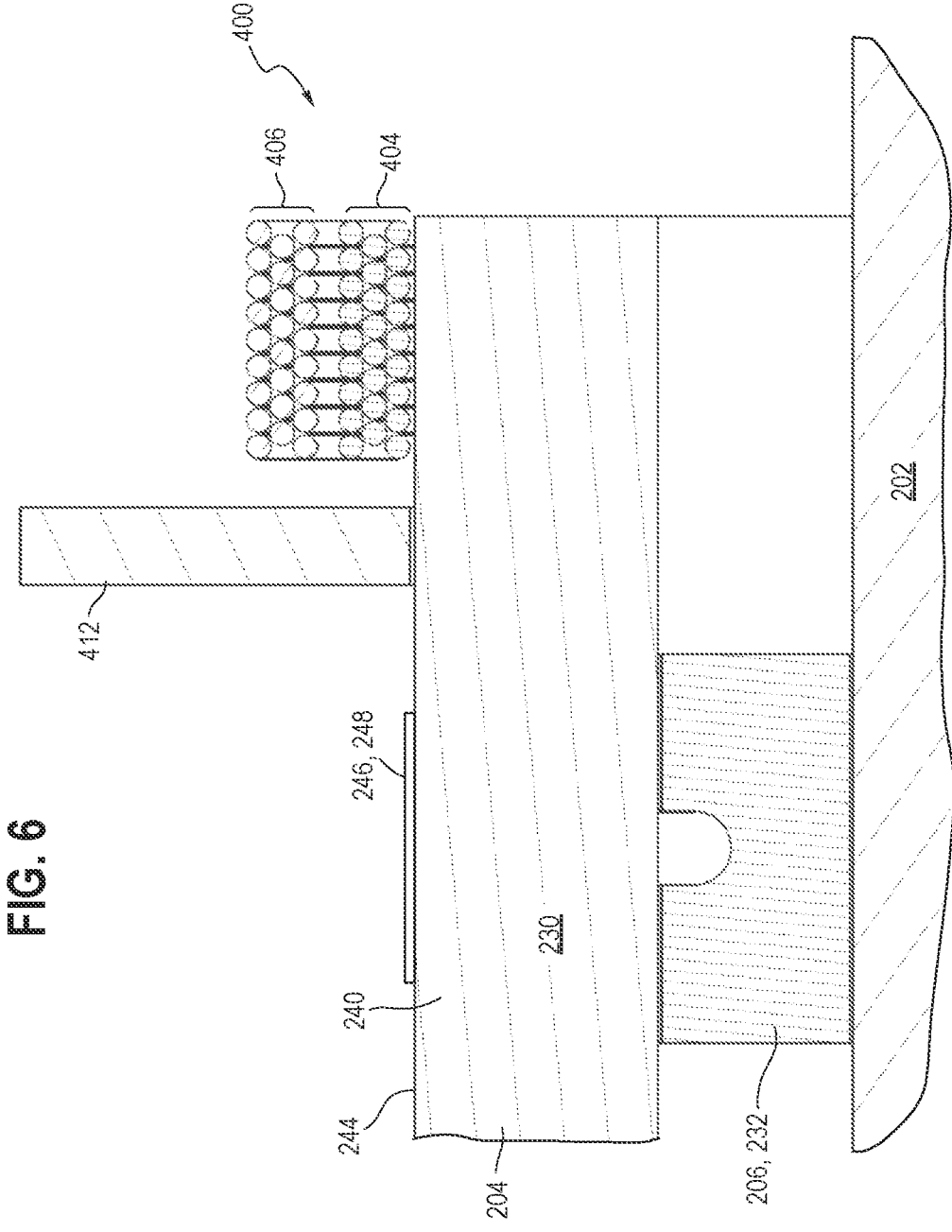
FIG. 6 an enlarged partial cross-section of the drive system.
Figure 7:
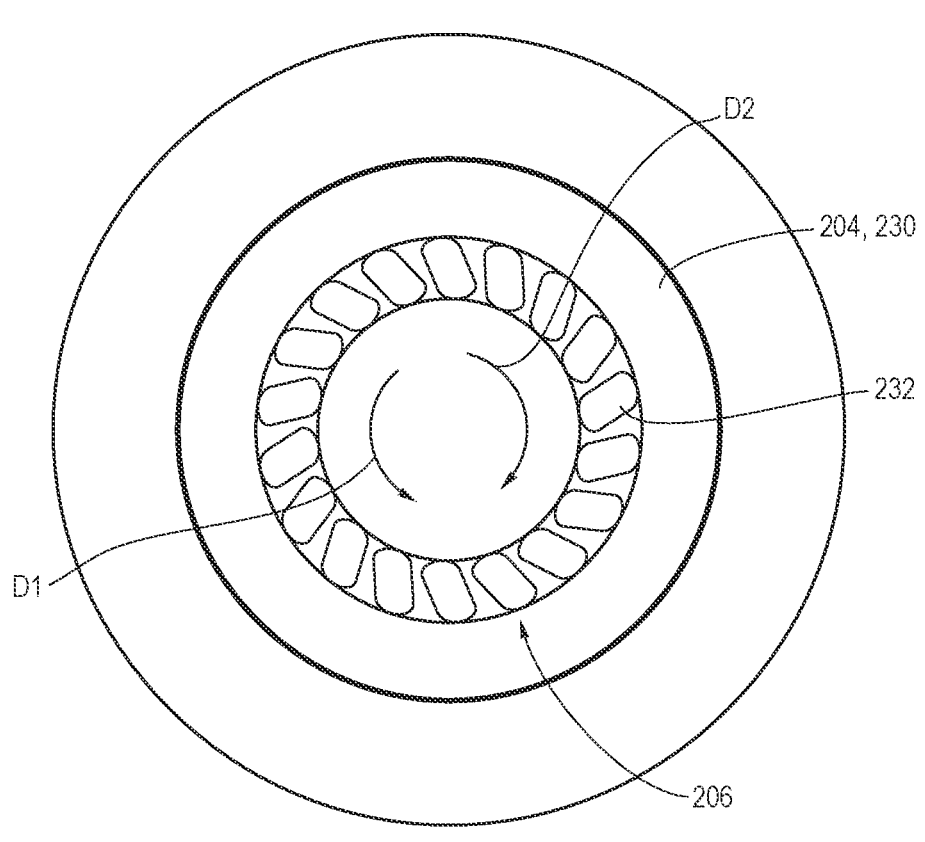
FIG. 7 is a partial end view of the drive system.

Referring to FIGS. 4-7, the clutch mechanism 206 includes elements 232 disposed between the crank axle 202 and the output ring 230. The elements 232 are, for example, sprag elements (e.g., cam-shaped wedges). Referring to FIG. 6, the clutch mechanism 206 may include any number of sprag elements 232 disposed within a volume between the crank axle 202 and the output ring 230. For example, as shown in FIG. 7, the clutch mechanism 206 may include eighteen sprag elements 232 disposed around the crank axle 202. In other embodiments, the clutch mechanism 206 includes more or fewer sprag elements 232. The sprag elements 232 may be equally spaced relative to each other around the crank axle 202.

Each of the sprag elements 232 is angled relative to a radius of the crank axle 202 through a centroid of the respective sprag element 232. In one embodiment, each of the sprag elements 232 is angled at a same angle. This orientation of the sprag elements 232 relative to the crank axle 202 and the output ring 230 provides that the crank axle 202 and the output ring 230 rotate together (e.g., lock up like a solid shaft) when the crank axle 202 is rotated in a first rotational direction D1. When the crank axle 202 is rotated in a second rotational direction D2 that is opposite the first rotational direction D1 or the output ring 230 is rotated faster than the crank axle 202 (e.g., via the electric drive motor 200), the sprag elements 232 slip or overrun, allowing the crank axle 202 to rotate relative to the output ring 230, or vice versa.

The clutch mechanism 206 generates high strain in a hoop section 240 of the outer race of the clutch mechanism 206 (e.g., the output ring 230), as shown for example in FIGS. 5-10C. The strain in the hoop section 240 is proportional to reacted torque. Thus, by measuring the strain in the hoop section 240 of the output ring 230 (i.e., output component), for example, input torque at the crank axle 202 (i.e., input component), may be determined.

The drive unit 138 and/or the frame 52 of the bicycle 50 may support the torque sensor 220, circuits driving the torque sensor 220, and circuits processing signals measured by the torque sensor 220.

Figure 2:
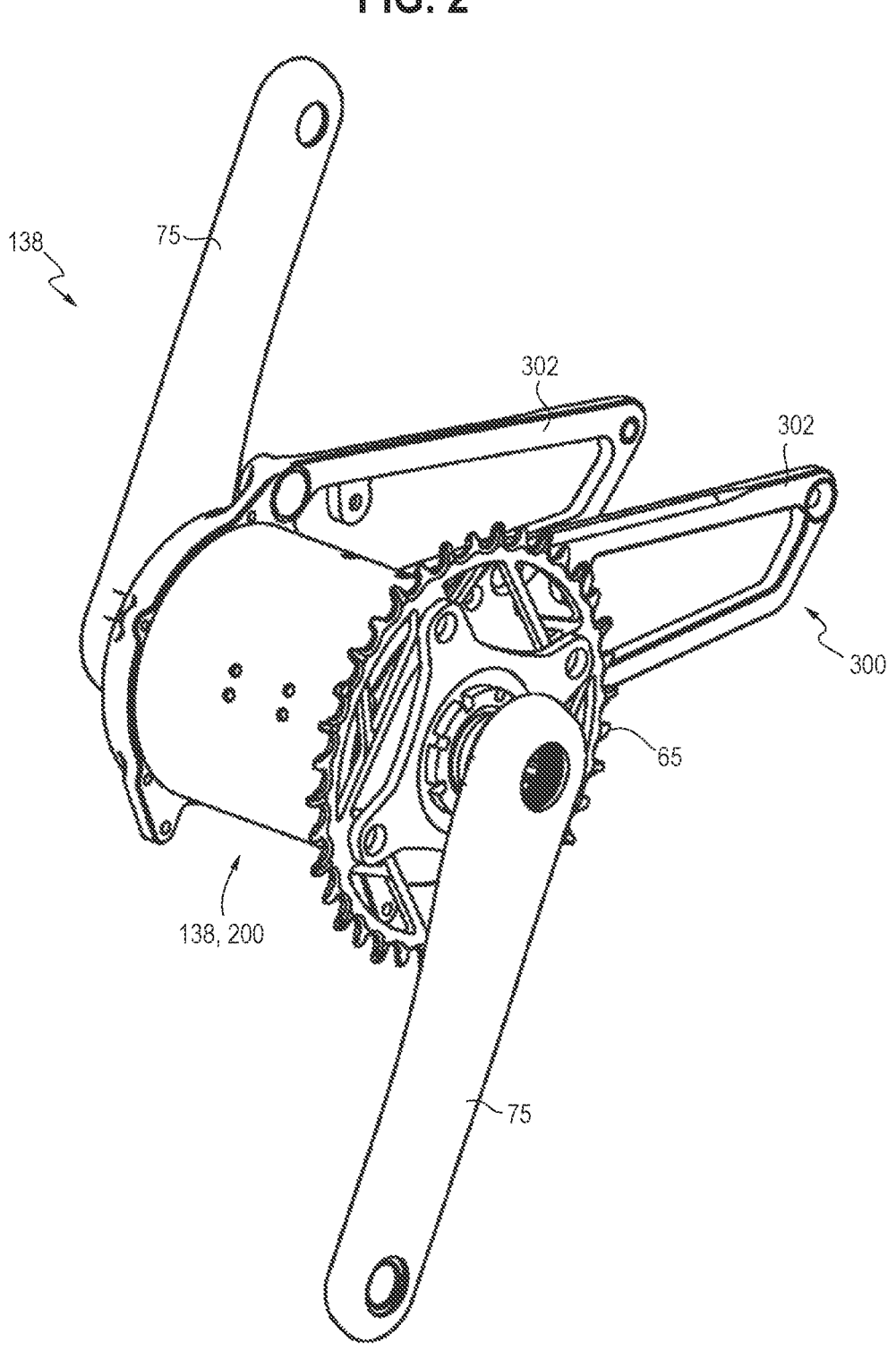
FIG. 2 is a perspective view of one embodiment of a drive system.
Figure 3:
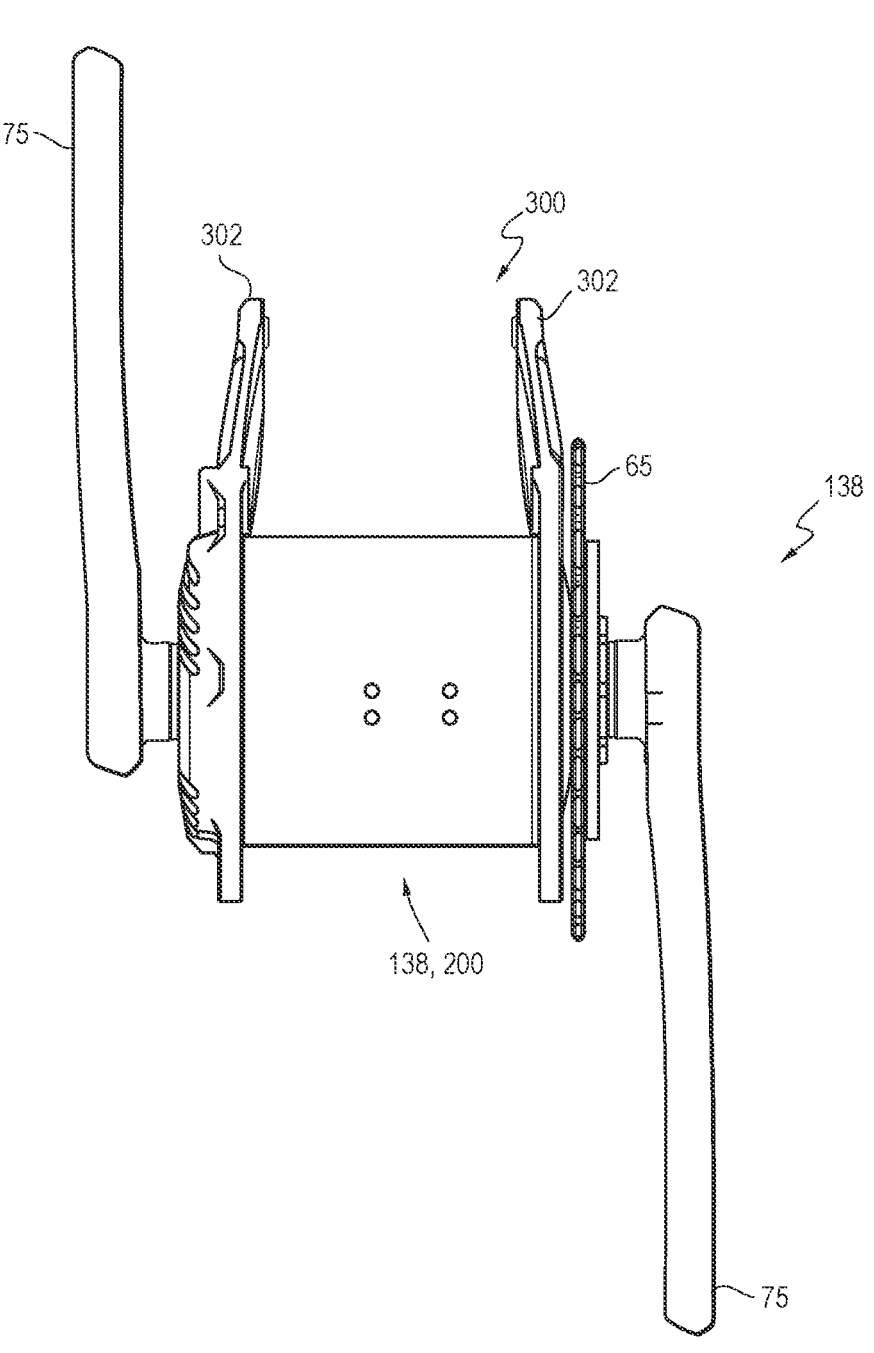
FIG. 3 is a top view of the drive system of FIG. 2.

Referring to FIGS. 2-4, the drive unit 138 may be mounted to the frame 52 of the bicycle via a support structure 300. The support structure 300 may include a first and second supports 302 supporting the drive unit 138 on opposite sides of the drive unit 138, respectively. The first and second supports 302 may be attached to the frame 52 of the bicycle with the drive unit 138 captive within the support structure 300, and the support structure 300 is attached to the bicycle. In one embodiment, the frame 52 of the bicycle may include a hollow cylinder portion (e.g., a bottom bracket shell), through which the drive unit 138 extends, and the first and second supports 302 are attached to opposite sides of the hollow cylinder portion of the frame of the bicycle. The support structure 300 may be attached to the frame of the bicycle in any number of ways including, for example, with bolts and openings within the support structure 300 and the frame of the bicycle. As can be appreciated, the motor 200, including the rotor 250, transmission 260, output component 204 and input component all rotate about the same axis 272, and are therefore concentric.

Referring R to FIGS. 4-12, a torque sensor system 270 includes the output component 204 rotatable about a rotation axis 272 and the torque sensor 220. The output component 204 is rotated by the electric motor 200, for example the rotor 250 that is rotatable about the axis 272 and concentric with the output component 204. The torque sensor 220 includes a contact sensor 242 coupled to the output component 204, for example the surface of the hoop section 240. The phrase "contact sensor" refers to a sensor that is in physical contact with the component from which the sensor is deriving the information being sensed. For example, the contact sensor 242 may be in contact with the output component 204, and is rotatable with the output component 204 about the axis 272, in order to measure a torque applied to the output component 204 and provide an input signal. In one embodiment, the contact sensor 242 may be a strain sensor 246, for example a strain gauge, which is coupled to the output component 204, and in particular the outer circumferential surface 244 of a cylindrical portion of the hoop section 240, which experiences hoop stress. The contact sensor 242, e.g., strain gauge, may be coupled to the output component for example by adhering the strain gauge to the outer circumferential surface 244 of the output component, wherein the contact sensor 242 is rotatable with output component 204, and the hoop section 240 in particular, in one embodiment.

The contact sensor 242 may maintain contact with the component using any technique. For example, adhesion and/or other physical attachment may be used as part of the contact sensor to dispose the contact sensor in contact with the output component 204. In an embodiment, for example as with strain sensor embodiments described herein, foil type strain gauges 246 may be coupled with the output component 204 using an adhesive between the strain gauge 246 and the output component 204. As such, the strain gauge 246 will maintain contact with the output component 204 in such a way that strain of the output component, and the hoop section 240 in particular in one embodiment, may be sensed by the strain sensor 246 through and/or with the adhesive. Such configuration results in a contact sensor 242. In other embodiments, a measuring device of a contact sensor 242 may be coupled with the output component 204 such that strain of the output component 204 may be measured absent the existence of an adhesive. For example, a clamp, band, or other suitable technique/attachment device may be used to couple the measuring device, i.e., contact sensor 242, to the output component 204 such that the contact sensor 242 is in physical contact with the component.

Figures 10A, 10B, 10C:
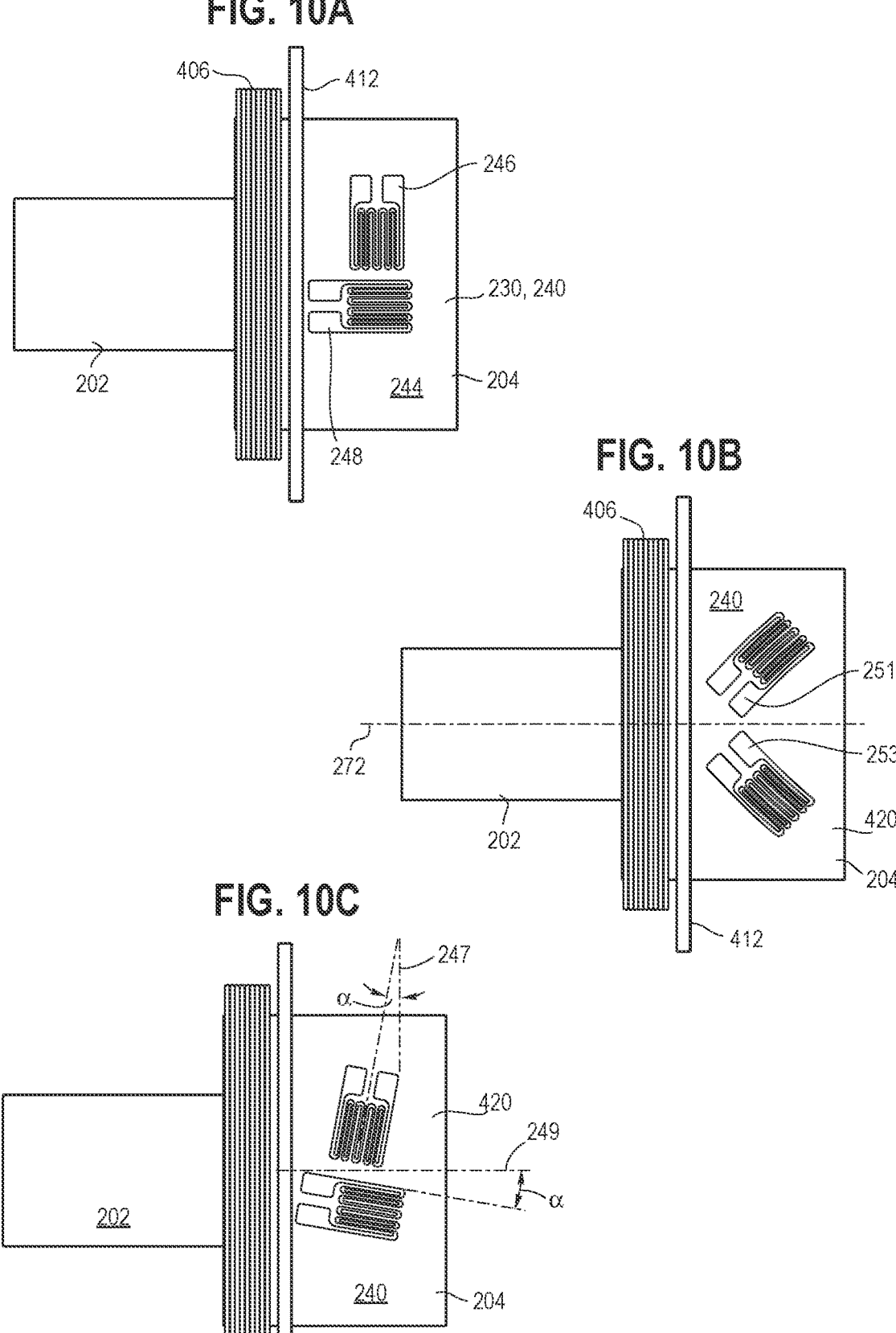
FIGS. 10A-C show different contact sensor arrangements.

As shown in FIGS. 10A-C, the contact sensor 242 may include a plurality of strain sensors 246, 248. In one embodiment, a pair of strain gauges 246, 248 is disposed along the race of the output component 204 and in radial alignment with the sprag type rotary clutch 206, as shown in FIGS. 5 and 6. During riding, the rotary clutch 206 generates a high strain in the hoop section 240 of the outer race, or output component 204, proportional to the reacted torque. The strain gauges 246, 248 may measure the strain in the hoop section 240 of the output component 204. The contact sensor 242 may be applied to other components, or other regions of the output component. In one embodiment, a primary strain gauge 246 is oriented along, and in alignment with, the race circumference of the output component 204, or orthogonal to the axis 272, in a region radially aligned with the clutch 206 so as to be sensitive to the hoop stress, while a reference strain gauge 248 is oriented orthogonal to the race circumference, or parallel to the axis 272, to be insensitive to hoop stress. The orientation of the primary and reference strain gauges 246, 248 are non-parallel, and are orthogonal in one embodiment. By measuring strain with a pair of strain gauges 246, 248 having different orientations, a signal due to thermal expansion may be removed from the output of the strain gauge 246. While the contact sensor 242 may also sense torque from the motor 200 being applied to the output component, the hoop stress from the sprag clutch 206, and user input, is substantially greater, and orders of magnitude larger (e.g., 100×), than the strain introduced to the output component 204 by the motor 200.

In an alternative embodiment, shown in FIG. 10C, the set of strain gauges 246, 248 may be slightly skewed, for example at an angle α to automatically compensate for motor torque signal. In various embodiments, the angle α may be between and including 3-5 degrees relative to a circumferential race 247 or a line 249 along the surface parallel to the axis 272.

In another embodiment, shown in FIG. 10B, an additional set of strain gauges 251, 253 may be applied to the output component 204 and oriented to detect the torque applied to the output component by the motor 200. For example, the set of strain gauges 251, 253 shown in FIG. 10B may be applied to the output component in addition to the strain gauges 246, 248 shown in FIG. 10A. A microprocessor receives the input from both sets of strain gauges 246, 258, 251, 253 and applies a compensation to the strain gauge set 246, 248 of configuration shown in FIG. 10A to subtract the input signal of motor torque detected by the strain gauge set 251, 253 of FIG. 10C.

Referring to FIGS. 4-6, 11 and 12, a contactless sensor 400 is disposed between the output component 204 and a fixed component 402, such as a housing or bicycle frame.

Figure 8:
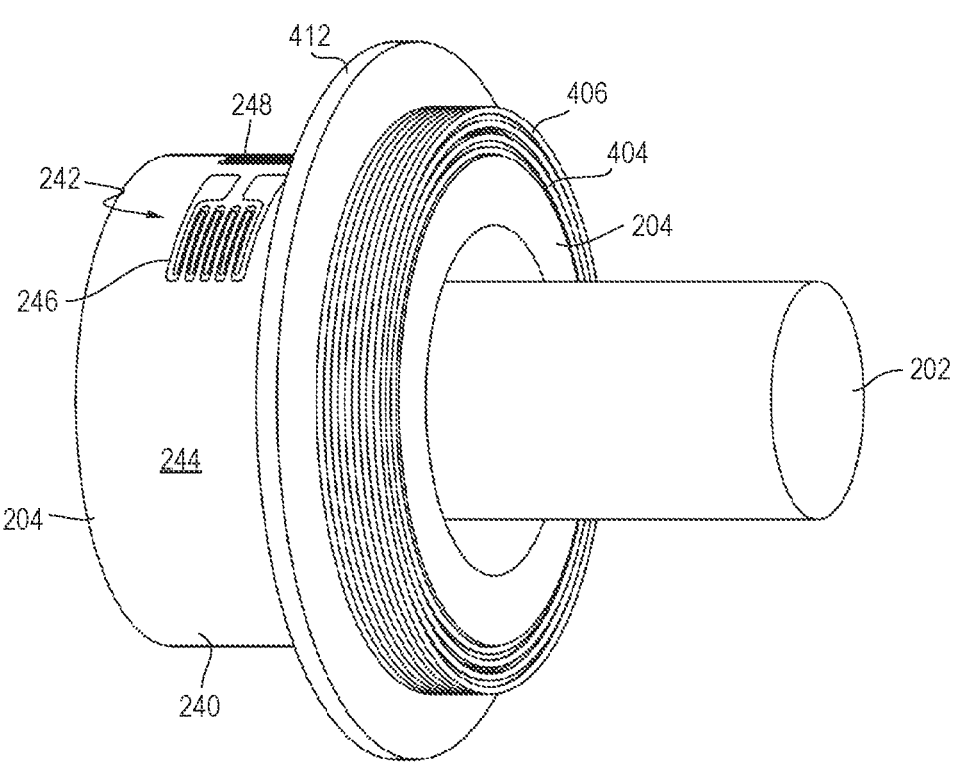
FIG. 8 is a partial inner perspective view of the drive system.
Figure 9:
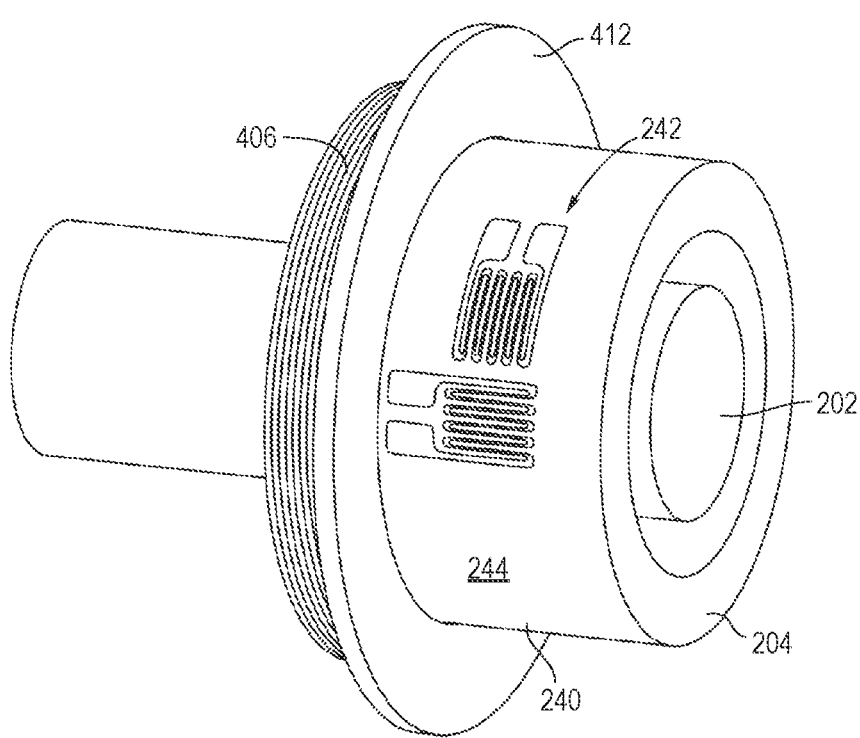
FIG. 9 is a partial outer perspective view of the drive system.

The phrase "contactless sensor" refers to a sensor or device that includes a component or portion not in physical contact with the component from which the sensor is deriving the information being sensed, or communicated, even if another portion of the sensor may be in physical contact with the component. As shown, the contactless sensor 400 is configured to provide an output signal proportional to an input signal from the contact sensor 242. The input signal is received by the microprocessor 408. In one embodiment, the contactless sensor 400 is configured as a transformer, and includes an inner transformer coil 404 and an outer transformer coil 406 spaced apart from and surrounding the inner transformer coil 404. The inner transformer coil 404 is coupled to the output component 204 and is rotatable about the axis 272 with the output component 204. The inner transformer coil 404 may be axially or longitudinally spaced from the contact sensor 242 as shown in FIG. 8. The outer transformer coil 406 is coupled to the fixed component 402, which is non-rotatable, and defines in part the "contactless sensor," since the outer transformer coil 406 is not in physical contact with the output component 204 or inner transformer coil 404, but rather is radially spaced from both. In this way, the transformer defines a contactless sensor, by way of the outer transfer coil 406, notwithstanding that the inner transformer coil 404 is in physical contact with the output component 204. A microprocessor 408 is coupled to the output component 204 and is rotatable about the axis 272 with the output component. The microprocessor 408 is operably coupled to the contact sensor 242. A bridge amplifier 416 may be disposed between the contact sensor 242 and microprocessor 408, which is in communication with the rotating coil 404. The microprocessor 408 is configured to receive the input signal from the contact sensor 242 and to control a duration or frequency of a load current drawn by the contactless sensor 400. A second microprocessor 410 may be operably coupled to the contactless sensor 400, wherein the second microprocessor 410 is configured to receive the output signal and calculate the torque applied to the output component. In one embodiment, the microprocessor 410 is operably coupled to the outer transformer coil 406. A current shunt amplifier 419 may be disposed between the microprocessor 410 and the fixed coil 406.

A printed circuit board (PCB) 412 may be coupled to the output component 204 and is rotatable about the axis 272 with the output component 204. In one embodiment, shown in FIG. 8, the PCB 412 is positioned and coupled to the output component 204 between the contact sensor 242 and the inner transformer coil 404. The PCB may include the microprocessor 408 operably coupled to the contact sensor 242, e.g., strain sensors 246, 248. In one embodiment, the PCB 412 is configured as an annular ring having an inner circumferential surface 414 surrounding and coupled to the outer circumferential surface 244 of the output component 204, for example by friction fit and/or bonding with adhesive, and the cylindrical portion of the output component 204 in particular in one embodiment.

Figure 12:
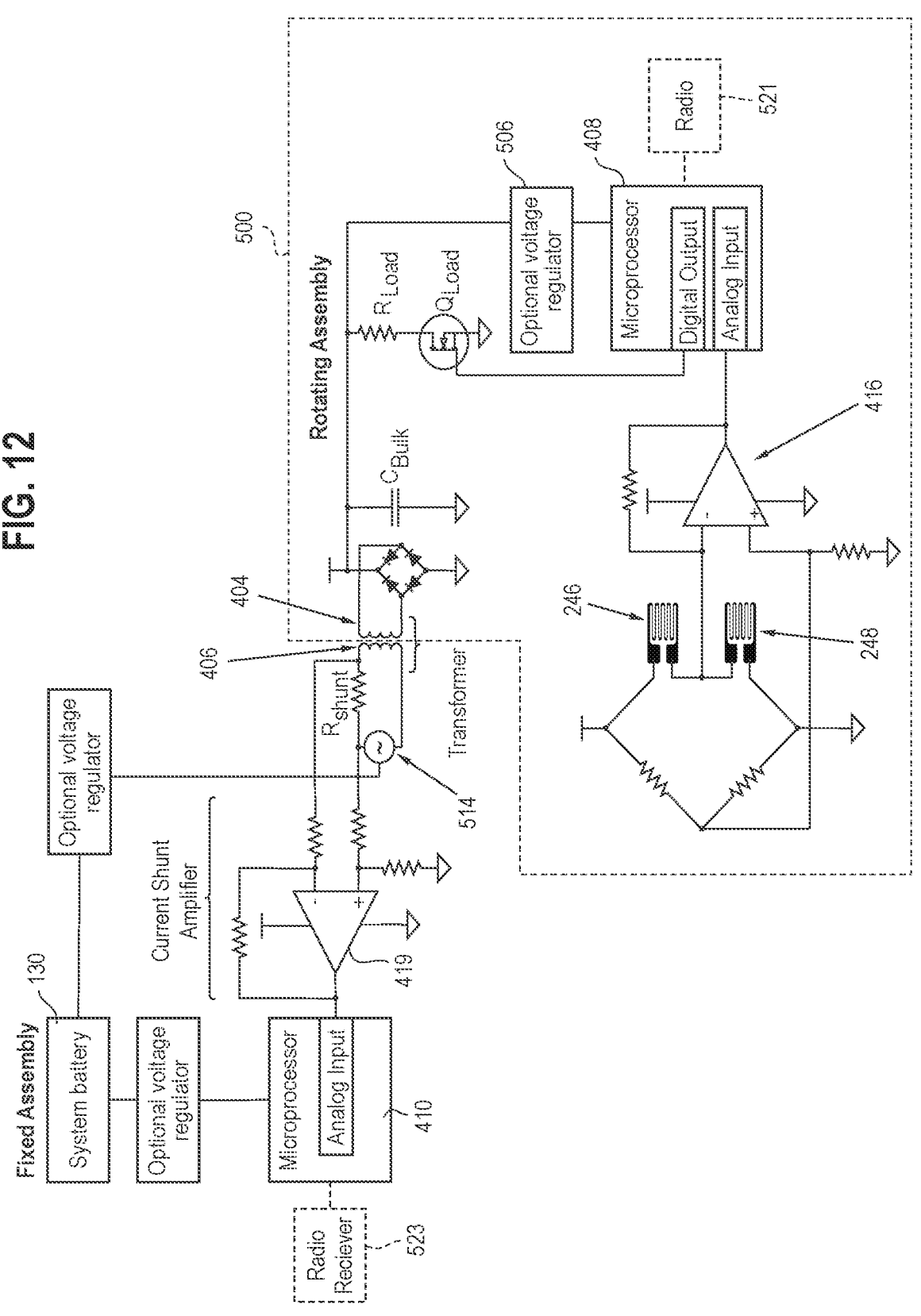
FIG. 12 is a schematic diagram of one embodiment of a torque sensor.

In operation, and referring to FIGS. 11 and 12, the rotating inner coils 404 receive an additional load current which is added through QLoad+RLoad, where QLoad is a MOSFET (Metal Oxide Semiconductor Field Effect Transistor) for switching the additional load current. Another example would be a BJT (bipolar junction transistor), or any other switching device. The microprocessor 408 on the rotating PCB 412 controls the duration of adding the load current, to create a periodically additional current to the rotating inner coils 404. Within the transformer coils, a voltage is induced in the fixed outer coils 406 by the periodically additional current of the rotating inner coils 404. An alternating current is measured from the fixed outer coils 406 by applying Rshunt (shunt resistor) with an inverter. In this way, the current supplied by the fixed coils 406 in the fixed assembly is proportional to the current consumed by the rotating inner coils 404 in the rotating assembly. Therefore, a measured torque from the strain gauges 246, 248 may be determined from the rotating assembly to the fixed assembly, with the contactless sensor or transformer, by periodically drawing additional current, which is added through QLoad+RLoad.

Simply, the duration of the additional current draw is proportional to the measured torque of the contact sensor 242. The first microprocessor 408 is configured to receive the input signal from the contact sensors 242 and to control a duration or frequency of a load current drawn by the inner transformer coils 404. The duration of the additional current draw is proportional to the measured torque.

Figure 13:
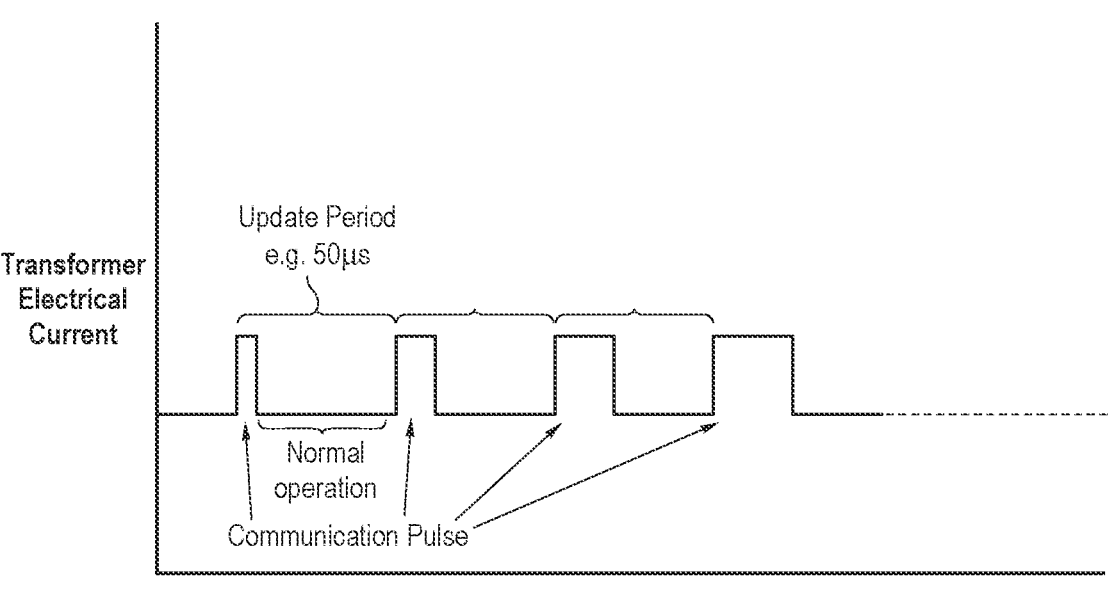
FIG. 13 is one embodiment of a current draw v. time graph used to calculate the measured torque.
Figure 14:
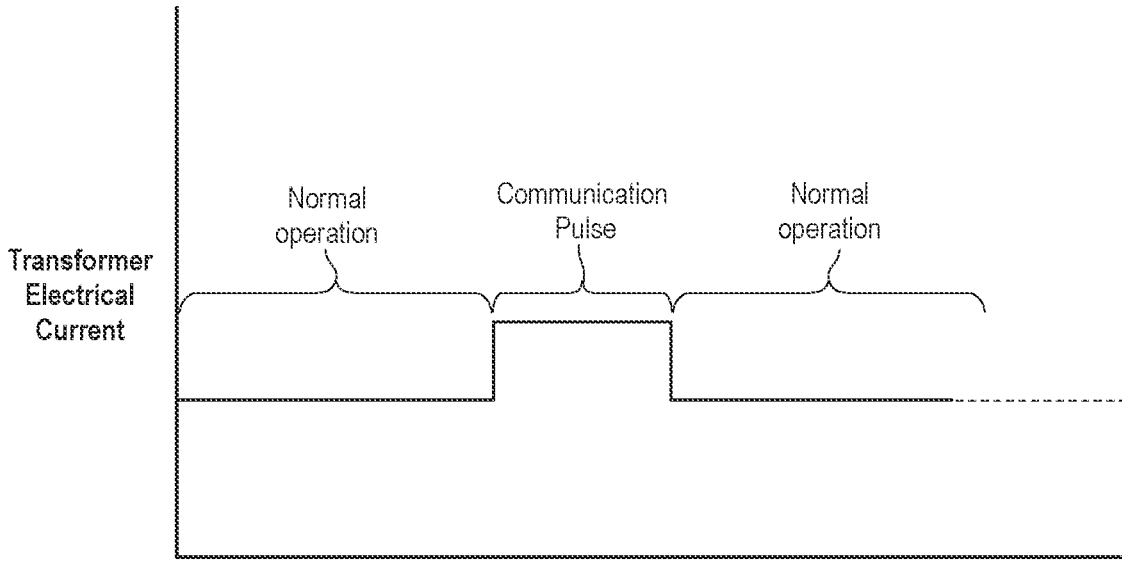
FIG. 14 is another embodiment of a current draw v. time graph used to calculate the measured torque.

Referring to the Transformer Electrical Current v. Time diagram shown in FIG. 13, for example, a measured torque of 1 Nm could be derived as corresponding to a current pulse of 1 ms; a measured torque of 3 Nm could be derived as corresponding to a current pulse of 3 ms. The communication pulse would repeat with new measurement data at a useful rate, or update period, such as every 50 ms. The pulse may have some minimum duration so that zero torque does not result in no signal so that communication errors can be detected. In another embodiment, shown in FIG. 14, the pulse duration may be fixed (e.g. 1 ms), with the period between pulses representing the torque value (frequency encoding).

Referring to FIGS. 11 and 12, the torques sensor includes a fixed assembly 502 and a rotating assembly 500. In addition to the contact sensor 242, microprocessor 408 and inner transformer coil 404, the rotating assembly may include, for example on the PCB 412, an antenna 504 and voltage regulator 506, and provide signal conditioning. The fixed assembly may include, for example on a PCB, an antenna 516, the microprocessor 410, inverter 514 and amplifier 419, and the outer transformer coil 406. The rotating assembly may be powered by the transformer (coils 404, 406) with some power conditioning/regulation after the rectifier stage.

In another embodiment, and referring to FIG. 12, a radio transmitter 521 is in communication with and may transmit a signal, via an antenna, from the microprocessor 408 on the rotating assembly (e.g., including the output component 204) to a radio receiver 523 on the fixed assembly, for example coupled to the microprocessor 410, with the radio transmitter 521 and receiver 523 thereby defining a contactless sensor, in that the receiver 523 is spaced apart from and not in physical contact with the transmitter 521 or output component 204. The radio transmitter 521 and microprocessor 408 may be powered by a local power source (e.g., battery) coupled to the output component 204, for example on the PCB 412, or may be powered by the transformer (coils 404, 406), or by an induction power source. The output signal from the radio transmitter 521 received by the receiver 523 is proportional to the input signal from, or torque measured by, the contact sensor 242.

The torque sensor may be configured to include a first sensor component, for example the contact sensor 242, inner transformer coil 404 and/or radio transmitter 521, coupled to the output component 204 and rotatable about the axis 272 with the output component 204, and a second sensor component, for example the outer transformer coil 406 and/or radio receiver 523, radially spaced apart from the first sensor component and coupled to a fixed component 402, wherein the first and second sensor components are configured to measure a torque applied to the output component 204. It should be understood that the system requires a first sensor component rotatable with the output component and a second sensor component non-rotatable with the output component, wherein the first and second sensor components are configured to measure a torque applied to the output component 204.

In one embodiment, the rider applies a torque to the input component, for example the crank axle 202. The input component in turn applies a torque to the output component by way of the one-way clutch 206, e.g., sprag clutch. The method further includes measuring the torque with the contact sensor 242 coupled to the output component, periodically drawing a load current in the contactless sensor 400 based on the measured torque, supplying a supply current to the contactless sensor 400 proportional to the load current, measuring the supply current supplied to the contactless sensor 400, and calculating the torque based on the measuring of the supply current. In one embodiment, periodically drawing the load current includes creating the load current in the rotating inner transformer coil 404, and supplying the supply current includes supplying the supply current to the outer transformer coil 406. The operation may also include receiving the input signal with the microprocessor 408 from the contact sensor 242 corresponding to the torque, and wherein periodically drawing the load current includes controlling the duration or frequency of the drawing of the load current with the microprocessor 408. In addition, calculating the supply current supplied to the contactless sensor 400 includes receiving a second input signal from the contactless sensor with the microprocessor 410 corresponding to the supply current and calculating the torque with the microprocessor 410 based on the second input signal.

Alternatively, the method includes measuring the torque with the contact sensor 242 coupled to the output component, and sending an output signal from the transmitter 521 to the receiver 523. The microprocessor 410 may calculate the torque based on the output signal received by the receiver and provide a signal to control the input from the motor 200 to the output component 204.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. Next one or more of the components may be paired with a separate device like a computer, tablet, or phone. This paired device may provide the user interface to allow the user to communicate with the components on the bicycle, for example the system control device. Examples of communication are updating firmware, setting variables, and running diagnostic tools and analysis.

In accordance with various embodiments of the present disclosure, the methods described herein may be implemented with software programs executable by a computer system, such as the system control device. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device 150 to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A torque sensor system for an electric bicycle comprising:
   an output component rotatable about an axis, wherein the output component is configured to be rotated by an electric motor;
   an input component rotatable about the axis and concentric with the output component, the input component being a crank axle;
   a contact sensor coupled to the output component, wherein the contact sensor is configured to measure a torque applied to the output component and provide an input signal; and
   a contactless sensor disposed between the output component and a fixed component, wherein the contactless sensor is configured to provide an output signal proportional to the input signal.

2. The torque sensor system of claim 1 wherein the contact sensor comprises a strain gauge coupled to the output component.

3. The torque sensor system of claim 1 wherein the contactless sensor comprises an inner transformer coil and an outer transformer coil spaced apart from and surrounding the inner transformer coil, wherein the inner transformer coil is coupled to the output component and is rotatable about the axis with the output component, and wherein the outer transformer coil is coupled to the fixed component.

4. The torque sensor system of claim 1 further comprising a one-way clutch disposed between the input component and output component, wherein the one-way clutch is engaged between the input component and the output component when the input component is rotated in a first rotational direction, and wherein the one-way clutch is disengaged between the input component and the output component when the input component is rotated in a second rotational opposite the first rotational direction.

5. The torque sensor of claim 1 wherein the output component comprises a cylindrical portion, wherein the contact sensor is applied to the cylindrical portion.

6. The torque sensor of claim 1 wherein the contactless sensor comprises a radio transmitter coupled to the output component and a radio receiver coupled to the fixed component.

7. The torque sensor system of claim 1 further comprising a first microprocessor coupled to the output component and rotatable about the axis with the output component, wherein the first microprocessor is operably coupled to the contact sensor, wherein the first microprocessor is configured to receive the input signal and to control a duration of a load current drawn by the contactless sensor.

8. The torque sensor system of claim 7 further comprising a second microprocessor operably coupled to the contactless sensor, wherein the second microprocessor is configured to receive the output signal and calculate the torque applied to the output component.

9. A torque sensor system for an electric bicycle comprising:
   an output component rotatable about an axis, wherein the output component is configured to be rotated by an electric motor;
   an input component rotatable about the axis and concentric with the output component, the input component being a crank axle; and
   a strain sensor coupled to the output component and rotatable about the axis with the output component.

10. The torque sensor of claim 9 further comprising a one-way clutch disposed between the input component and output component, wherein the one-way clutch is engaged between the input component and the output component when the input component is rotated in a first rotational direction, and wherein the one-way clutch is disengaged between the input component and the output component when the input component is rotated in a second rotational opposite the first rotational direction.

11. The torque sensor of claim 9 further comprising:
   a radio transmitter coupled to the output component and rotatable about the axis with the output component; and
   a radio receiver spaced apart from and in communication with the radio transmitter.

12. The torque sensor of claim 9 wherein the output component comprises a cylindrical portion, wherein the strain sensor is applied to the cylindrical portion.

13. The torque sensor of claim 12 wherein the strain sensor comprises a first strain gauge having a first orientation and a second strain gauge having a second orientation non-parallel to the first orientation.

14. The torque sensor of claim 9 further comprising:
   an inner transformer coil coupled to the output component and rotatable about the axis with the output component; and a non-rotatable outer transformer coil radially spaced apart from and surrounding the inner transformer coil.

15. The torque sensor of claim 14 further comprising a printed circuit board (PCB) coupled to the output component and rotatable about the axis with the output component.

16. The torque sensor of claim 15 wherein the PCB is configured as an annular ring.

17. The torque sensor of claim 15 further comprising a second microprocessor operably coupled to the outer transformer coil.

* * * * *